(12) United States Patent
Peng et al.

(10) Patent No.: US 6,650,618 B1
(45) Date of Patent: Nov. 18, 2003

(54) METHOD AND APPARATUS FOR MANAGING COMMUNICATIONS BETWEEN NODES IN A BI-DIRECTIONAL RING NETWORK

(75) Inventors: Wang-Hsin Peng, Ottawa (CA); Yang Sup Lee, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/345,453

(22) Filed: Jul. 1, 1999

(51) Int. Cl.[7] .............................................. H04L 12/43
(52) U.S. Cl. ...................................... 370/229; 370/235
(58) Field of Search ........................ 370/222, 229–240, 370/413, 468

(56) References Cited

U.S. PATENT DOCUMENTS

| | | | |
|---|---|---|---|
| 4,926,418 A | | 5/1990 | Cidon et al. |
| 5,179,548 A | * | 1/1993 | Sandesara ................... 370/222 |
| 5,297,137 A | | 3/1994 | Ofek et al. |
| 5,477,530 A | | 12/1995 | Ahmadi et al. |
| 5,748,900 A | * | 5/1998 | Scott et al. .................. 370/229 |
| 6,285,679 B1 | * | 9/2001 | Dally et al. .................. 370/413 |
| 6,314,110 B1 | * | 11/2001 | Chin et al. ................... 370/468 |
| 6,389,015 B1 | * | 5/2002 | Huang et al. ................ 370/222 |

OTHER PUBLICATIONS

*Improved Fairness Algorithms for Rings with Spatial Reuse,* IEEE/Acm Transactions on Networking, vol. 5, No. 2, Apr. 1997, Israel Cidon, Leonidas Georgiadis, Roch Guérin, and Yuval Shavitt.

*A Fair Control Mechanism with QoS Guarantee Support for Dual Ring LANs/MANs,* Master Thesis, Department of Electronic Engineering, Graduate School of Engineering, The University of Tokyo, Pisai Setthawong.

*A Local Fairness Algorithm for Gigabit LAN's/MAN's with Spatial Reuse,* IEEE Journal on Selected Areas in Communications, vol. 11, No. 8, Oct. 1993, Jeane S.–C. Chen, Israel Cidon, Yoran Ofek.

*A Novel Algorithm For Local Fairness On Dual Ring LANs/MANs Using Adaptive Rate Control,* Plaintree Systems Inc., Nov. 1998, Bijan Raahemi, Lutful Khan and Peter Cottreau.

* cited by examiner

Primary Examiner—Salvatore Cangialosi

(57) ABSTRACT

A fairness scheme is disclosed for managing data flow between nodes in a bi-directional ring network. A method in accordance with the invention controls the output bandwidth of nodes in a bi-directional ring network by: identifying a congested span comprising a head node having a congested downstream link, and a plurality of chain nodes contributing to the congestion in the downstream link: adjusting the output bandwidth of the head node as a function of the congestion in the downstream link; and adjusting the output bandwidth of the chain nodes as a function of the congestion in the downstream link.

30 Claims, 7 Drawing Sheets

METHOD AND APPARATUS FOR MANAGING COMMUNICATIONS BETWEEN NODES IN A BI-DIRECTIONAL RING NETWORK

FIELD OF THE INVENTION

The present invention relates generally to the management of communications between nodes in a network, and more particularly to schemes for managing data flow between nodes in a bi-directional ring network.

BACKGROUND OF THE INVENTION

Congestion occurs in a network when the bandwidth requirements of the nodes exceed the bandwidth of the network. Fairness schemes may be used to allocate bandwidth among the nodes in the network.

Global fairness schemes, such as those applied in token ring networks, consider the entire ring network regardless of where congestion may be occurring in the network. Global fairness schemes are inefficient in terms of bandwidth utilization as they do not apply spacial reuse. Spacial reuse is achieved when destination nodes remove their packets from network. This provides a doubling effect of the available ring bandwidth. By contrast, local fairness schemes augment spacial reuse and manage congestion more effectively.

Local fairness schemes isolate a congested section or span of the ring network and are thus more efficient. By considering only a span in a ring network, the problem of allocating bandwidth among nodes in the network is reduced to a linear model. Local fairness schemes are thus equally applicable to linear networks. A linear network will be considered herein as a type of ring network, i.e., a special case of a ring network which may be termed a broken ring network.

Local fairness schemes may involve the allocation of quotas to allow nodes limited access to the ring network and to give priority to ring traffic at any given node over its own transmissions. Access to the ring by each node may be regulated by circulating a control message around the ring. The message indicates to each node the maximum number of packets that it may transmit during the interval from the reception of one control message to the forwarding of a subsequent control message. In a sustained congested state, a quota scheme requires a fairness decision to be made and executed for each round of quota. Such schemes are associated with delay and jitter.

Local fairness schemes may apply algorithms that periodically modify and advertise target rates to upstream nodes based on the tandem rate or data flow through the node. Target rates are advertised regardless of whether congestion actually exists in the network. Such schemes generally do not scale effectively due to oscillation in the scheme. Such local rate control algorithms are limited to networks below a certain size. Adaptive rate control mechanisms gather data based on statistics, and quickly adapt to changes in the collected data. Inaccuracy in the data will causes misbehaviour in the fairness algorithm, thus limiting its scalability.

Thus, there is a need for a local fairness scheme for managing data flow between nodes in a bi-directional ring network having superior performance that utilizes bandwidth more effectively.

SUMMARY OF THE INVENTION

The present invention is directed to a scheme for managing data flow between nodes in a bi-directional ring network.

According to one aspect of the present invention, there is provided a method for managing the access of a node to a bi-directional ring network, the node having a downstream link and an output bandwidth, the method comprising the steps of: identifying the node as being part of a congested span; adjusting the output bandwidth of the node as a function of the congestion in the span.

According to a further aspect of the present invention, there is provided a method for managing the access of a node to a bi-directional ring network, the node having a downstream link and an output bandwidth, the method comprising the steps of: receiving at the node a DS rate from a downstream node in a congested span of which the node is a part; determining whether the downstream link of the node is congested; adjusting the output bandwidth of the node as a function of the DS rate and the congestion in the downstream link; adjusting the output bandwidth of one or more upstream nodes contributing to congestion in the downstream link as a function of the DS rate and the congestion in the downstream link.

According to a further aspect of the present invention, there is provided a method for managing the access of nodes to a bi-directional ring network, the method comprising the steps of: identifying a congested span comprising a head node having a congested downstream link, and a plurality of chain nodes contributing to the congestion in the downstream link; adjusting the output bandwidth of the head node as a function of the congestion in the downstream link; adjusting the output bandwidth of the chain nodes as a function of the congestion in the downstream link.

According to a further aspect of the present invention, there is provided an apparatus for managing the access of a node to a bi-directional ring network, the node having a downstream link and an output bandwidth, the apparatus comprising: means for identifying a congested span comprising a plurality of nodes: means for adjusting the output bandwidth of the nodes in the congested span as a function of the congestion in the span.

According to a further aspect of the present invention, there is provided computer executable software code stored on a computer readable medium, the code for managing the access of a node to a bi-directional ring network, the node having a downstream link and an output bandwidth, the code comprising: code to identify the node as being part of a congested span; code to adjust the output bandwidth of the node as a function of the congestion in the span.

According to a further aspect of the present invention, there is provided a programmed computer for managing the access of a node to a bi-directional ring network, the node having a downstream link and an output bandwidth, comprising: a memory having at least one region for storing computer executable program code; and a processor for executing the program code stored in the memory: wherein the program code includes: code to identify the node as being part of a congested span; code to adjust the output bandwidth of the node as a function of the congestion in the span.

According to a further aspect of the present invention, there is provided a computer readable medium having computer executable software code stored thereon, the code for managing the access of a node to a bi-directional ring network, the node having a downstream link and an output bandwidth, comprising: code identify the node as being part of a congested span; code to adjust the output bandwidth of the node as a function of the congestion in the span.

According to a further aspect of the present invention, there is provided a computer data signal embodied in a carrier wave comprising, for managing the access of a node to a bi-directional ring network, the node having a downstream link and an output bandwidth: identify the node as being part of a congested span; code to adjust the output bandwidth of the node as a function of the congestion in the span.

According to a further aspect of the present invention, there is provided an apparatus managing the access of a node to a bi-directional ring network, the node having a downstream link and an output bandwidth, the apparatus comprising: an identifier to identify the node as being part of a congested span; and adjuster to adjust the output bandwidth of the node as a function of the congestion in the span.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the invention will now be described with reference to the accompanying drawings, in which.

DETAILED DESCRIPTION OF EMBODIMENTS OF THE INVENTION

Figure 1:
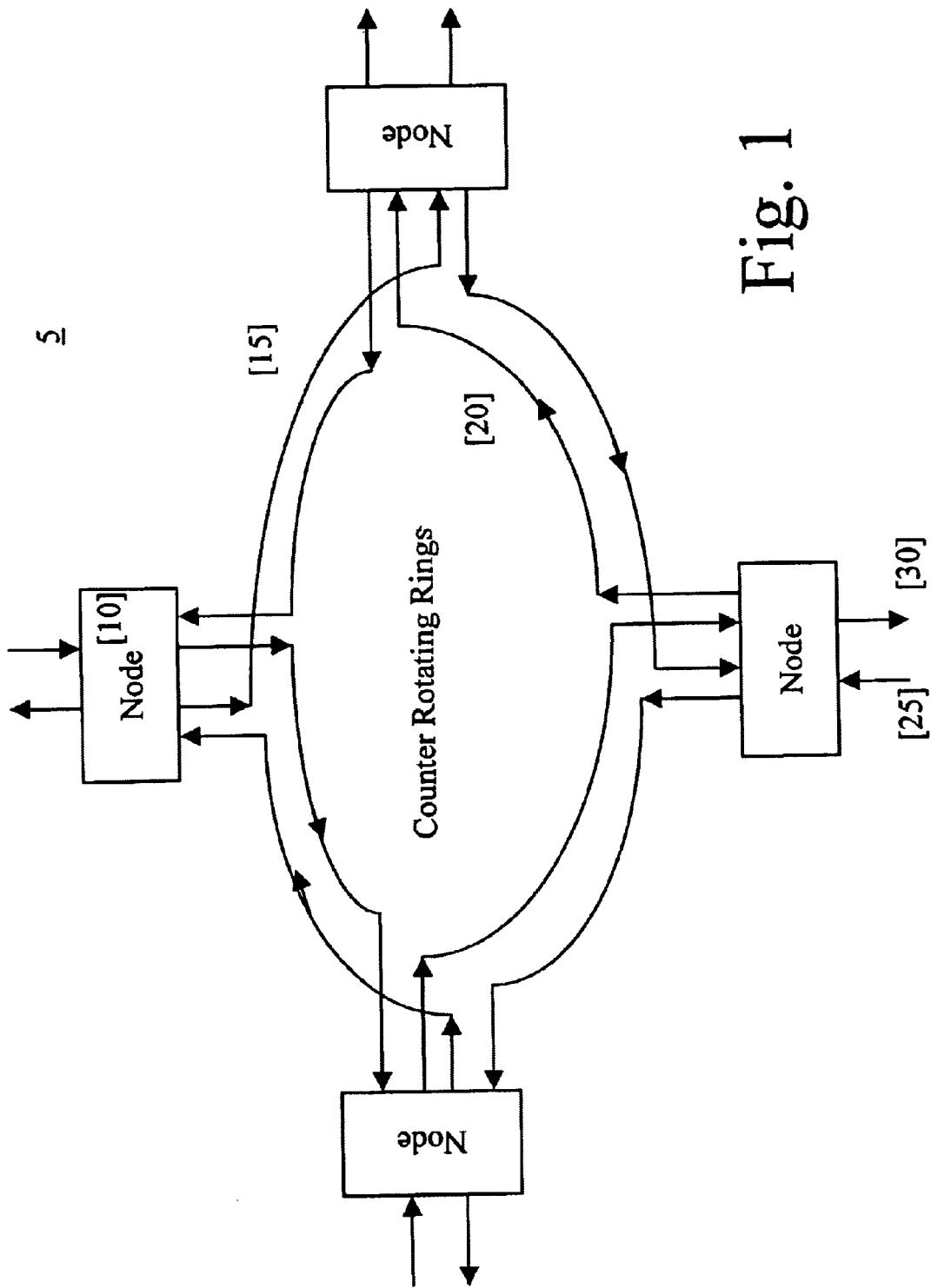
FIG. 1 depicts a bi-directional ring network.

FIG. 1 depicts a bi-directional ring network 5. The bi-directional ring network 5 includes a plurality of network elements or nodes 10. For the purposes of the present invention, the bi-directional ring network 5 could include a large number of nodes or as few as three nodes. The bi-directional ring network 5 also includes two counter rotating rings: Ring-1 15, which rotates counter-clockwise, and Ring-2 20, which rotates clockwise. Each node 10 is connected to Ring-1 15 with a Ring-1 WAN input port 65 and a Ring-1 WAN output port 70. Each node 10 is connected to Ring-2 20 with a Ring-2 input port 75 and a Ring-2 output port 80. In order to allow communication into and out of the bi-directional ring network 5, each node 10 also includes a WAN ingress port 25 and a WAN egress port 30.

Figure 2:
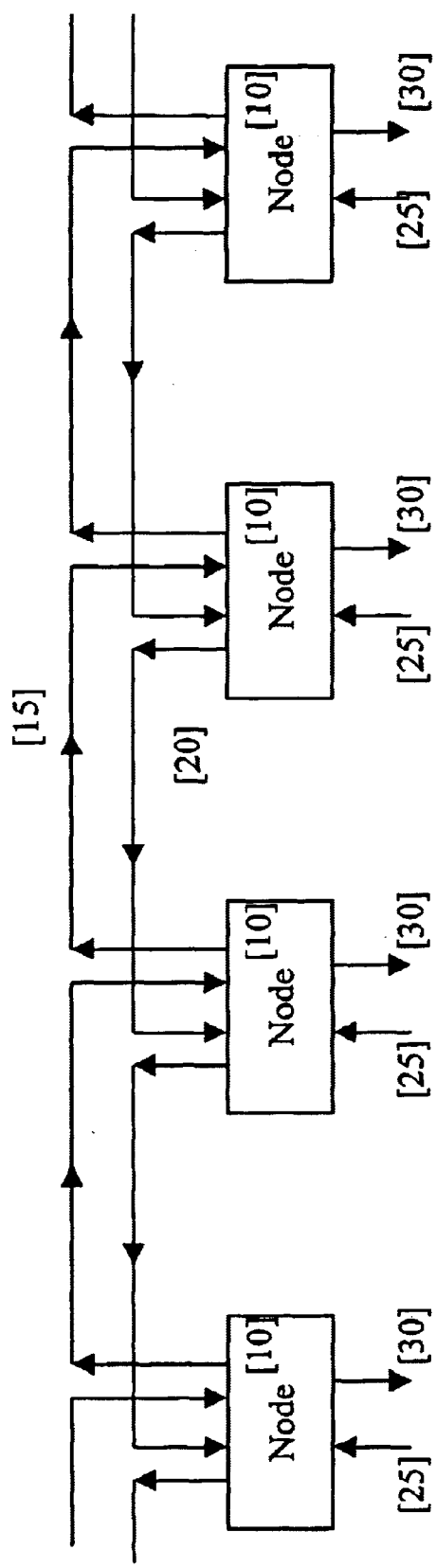
FIG. 2 depicts a segment of the bi-directional ring network of FIG. 1.

FIG. 2 depicts a segment of the bi-directional ring network 5 including four nodes 10. FIG. 2 could also represent a bi-directional linear network. Recall that a linear network will be considered herein as a type of ring network, i.e., a special case of a ring network which may be termed a broken ring network.

Figure 3:
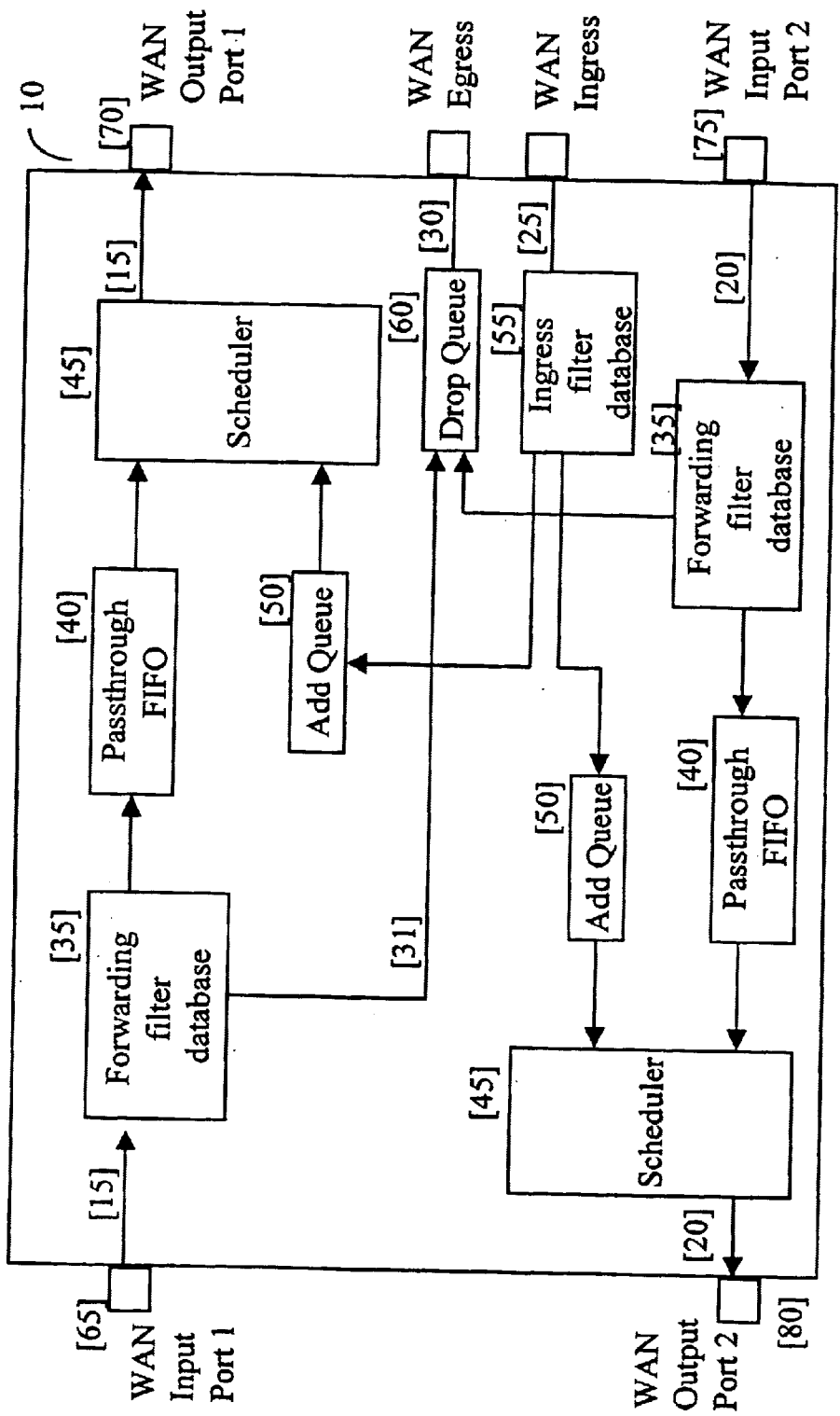
FIG. 3 depicts a node of the bi-directional ring network of FIG. 1.

FIG. 3 depicts the node 10 as shown in FIGS. 1 and 2. A data packet enters the node 10 from Ring-1 15 at the Ring-1 WAN input port 65. The packet enters a forward filter database 35. With reference to the address on the packet, a determination is made in the forwarding filter database 35 as to whether the packet is destined for that particular node 10.

If the packet is destined for the node 10, it is forwarded or dropped to a drop queue 60 and then to the WAN egress port 30.

If the packet is not destined for the node 10, it is forwarded on to a pass through interface or pass through FIFO 40 (i.e., first in first out shift register). The packet is then forwarded to an output scheduler 45. The output scheduler 45 schedules between the Ring-1 WAN input port 65 and the WAN ingress port 25. Packets entering the node 10 at WAN ingress port 25 destined for Ring-1 15 are forwarded to an ingress filter database 55 and to an add queue 30 before being forwarded to the output scheduler 45. Packets are forwarded from the output scheduler 45 to Ring-1 WAN output port 70. The second of Ring 1 15 between node 10 and node 13 will be termed the downstream link 16.

A data packet entering the node 10 from Ring-2 20 at the Ring-2 WAN input port 75 follows a similar path as described above.

Congestion occurs in the downstream link 16 when the output bandwidth or data flow rate, generally measured in bits per second (bps), exceeds a certain value. In a given context, congestion may be defined to mean the maximum bandwidth or data flow rate that the downstream link 16 can handle. Congestion may be defined in other ways, e.g., as a function of the maximum bandwidth or rate of the downstream link.

For the purpose of the present application, the tandem rate is the data flow rate through the node 10, i.e., through the pass through FIFO 40. The add rate is the data flow rate that a particular node is contributing to a ring, i.e., the rate from the WAN ingress port to the scheduler. Congestion will occur in the downstream link 16 when the sum of the tandem rate and the add rate exceeds the bandwidth of the downstream link. In a given fairness scheme, congestion may be considered to occur in the downstream link 16 when the sum of the tandem rate and the add rate reaches a predefined bandwidth or data flow rate. The target rate is the maximum allowable add rate as specified by a fairness scheme. An advertised rate is a target rate specified by a downstream node to upstream nodes in a congested span. Once received by a particular node, an advertised target rate may be termed a DS rate.

Figure 4:
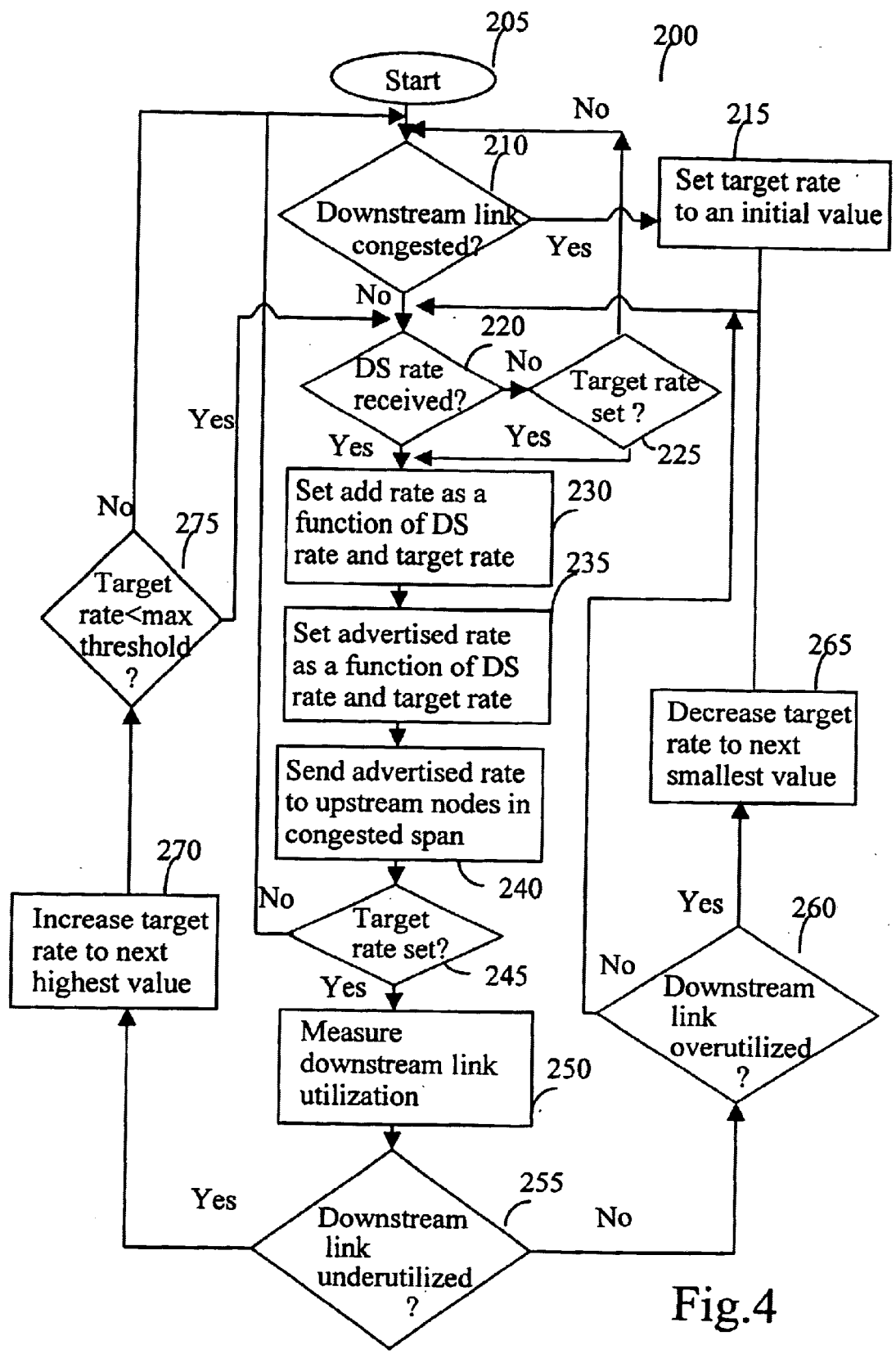
FIG. 4 is a flow chart depicting a fairness algorithm embodying the present invention.

FIG. 4 is a flowchart of a fairness algorithm 200 for managing the access of a node to a bi-directional ring network. At Step 205, the algorithm 200 begins.

At Step 210, a determination is made as to whether the downstream link is congested. The downstream link is congested if the output bandwidth of the node has reached a predetermined level, such as the maximum bandwidth of the downstream link or a function thereof.

If it is found that the downstream link is congested, then at Step 215, the target rate of the node is set to an initial value. If the downstream link is congested, the node is a head node in a congested span.

Regardless of whether it is found at Step 210 that the downstream link is congested, a determination is made at Step 220 as to whether a DS rate has been received from a downstream node. Receipt of a DS rate indicates that the node is a chain node in a congested span.

If it is found at Step 225 that no DS rate has been received, a determination is made as to whether a target rate has been set at Step 215. If no target rate has been set, then the node is not part of a congested span, i.e., it is neither a head node (Step 210) nor a chain node (Step 220). The algorithm 200 then loops band to Step 210, where, as described above, a determination is again made as to whether the downstream link is congested.

If it is found at Step 225 that a DS rate has been received, then at Step 230, the add rate of the node is set as a function of the target rate and the DS rate. Note that there may be only a target rate, only a DS rate, or both a target rate and a DS rate.

At Step 235, the advertised rate of the node is set as a function of the target rate and the DS rate. Again, note that there may be only a target rate, only a DS rate, or both a target rate and a DS rate.

At Step 240, the advertised rate is sent to upstream nodes, i.e., chain nodes, in the congested span. Preferably, the chain nodes will apply the algorithm 200.

At Step 245, a determination is made as to whether a target rate has been set, i.e., at Step 215, Step 265 or Step 275. If no target rate has been set, then the node is not part of a congested span, i.e., it is neither a head node nor a chain node. The algorithm 200 then loops back to Step 210, where, as described above, a determination is again made as to whether the downstream link is congested.

If it is found at Step 245 that a target rate has been set, then at Step 250, the utilization of the downstream link is measured. The utilization of the downstream link is a measure of the level of congestion of the downstream link, i.e., it is a measure of the output bandwidth of the node relative to a predetermined level, such as the maximum bandwidth of the downstream link or a function thereof. The desired level of utilization of the downstream link may or may not be the same as the definition of congestion used in Step 210.

At Step 255, a determination is made as to whether the downstream link is underutilized, i.e., whether the output bandwidth of the node is less than a predefined desired level of utilization.

If it is found at Step 255 that the downstream link is not underutilized, then at Step 260, a determination is made as to whether the downstream link is overutilized, i.e., whether the output bandwidth of the node is greater than a predefined desired level of utilization.

If it is found at Step 260 that the downstream link is not overutilized, then the output bandwidth of the node must be equal to the predefined desired level of utilization. Thus, the target rate does not need to be adjusted, and the algorithm 200 then loops back to Step 220, where, as described above, a determination is again made as to whether a DS rate has been received from a downstream node.

If it is found at Step 260 that the downstream link is overutilized, then at Step 265, the target rate is decreased. In a quantized rate control scheme, the target rate is decreased to the next smaller value. The algorithm 200 then loops back to Step 220, where, as described above, a determination is again made as to whether a DS rate has been received from a downstream node.

If it is a found at Step 255 that the downstream link is underutilized, then at Step 270, the target rate is increased. In a quantized rate control scheme, the target rate is increased to the next largest value.

At Step 275, a determination is made as to whether the target rate has reached a predetermined maximum threshold. The maximum threshold may be equal to the maximum bandwidth of the downstream link or a function thereof. The maximum threshold may be a function of the desired level of utilization of the downstream link used in Steps 255 and 260, or the definition of congestion used in Step 210. If it is found that the target rate has reached the maximum threshold, the algorithm 200 then loops back to Step 210, where, as described above, a determination is made as to whether the downstream link is congested. If it is found that the target rate has not reached the maximum threshold, then algorithm 200 loops back to step 220, where, as described above, a determination is again made as to whether a DS rate has been received from a downstream node.

Figure 5:
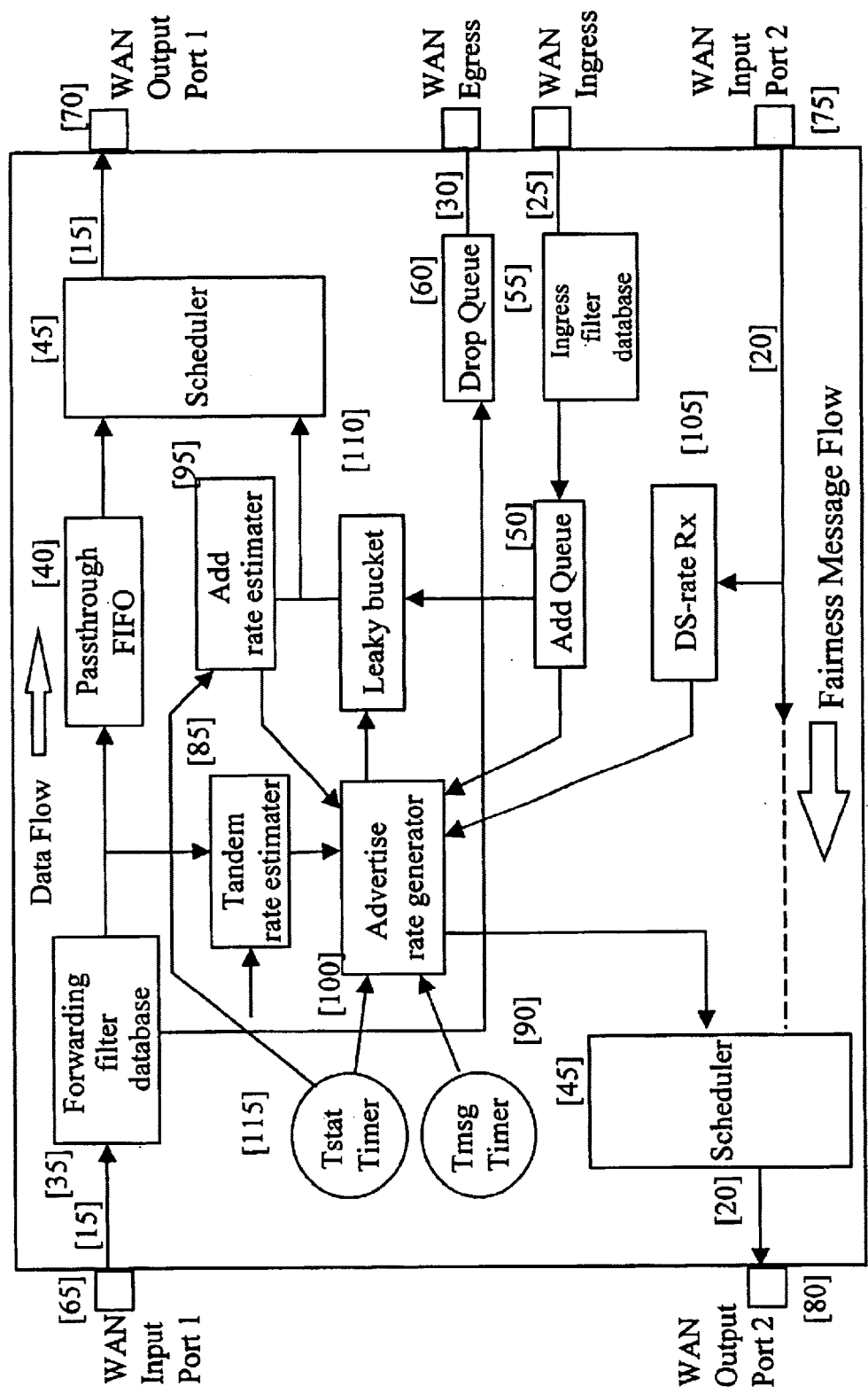
FIG. 5 depicts a node of the bi-directional ring network of FIG. 1 embodying the present invention.

FIG. 5 depicts a node 10 embodying the present invention. The node 10 includes the following components:

Tandem rate estimator 85.

A timer 90 used for calculating statistics, Tstat.

An add rate estimator 95 used to calculate the actual add traffic rate at a node.

An Advertised rate generator 100 to calculate new target rates for the nodes in a congested span.

A Downstream rate receive module 105. This mode listens to the fairness message on the ring opposite to the one where traffic rates are measured.

A Leaky bucket 110 to control the add traffic rate.

A timer 115 to periodically send out Fairness messages, including target rates for congested nodes in a congested span. The timer duration is called Tmsg.

If there is no congestion, each node can send packets up to the maximum ring bandwidth. When congestion is detected, a group of nodes is identified as a congested span or congestion span. The fairness algorithm is enable. It is a closed loop control mechanism that monitors data flow rates in one direction, on one ring, and sends Fairness messages in the opposite direction to the upstream nodes in a congested span to alleviate the congestion by controlling their output rate.

As a packet arrives at the WAN input port 65, a decision is made either to drop the packet at this node, or to forward the packet outwards, continuing on the ring, via the passthrough FIFO 40 and the scheduler 45. Passthrough packets are counted by the Tandem rate estimator 85 over Tstat. Similarly; all packets added by the current node on to the ring are counted by the Add rate estimator 95. In the uncongested case, the leaky bucket 110 is not enabled, so all packets from the WAN ingress port 25 will be counted by the Add Rate estimator 95 as it is scheduled to go out on the Ring.

The following operations are continuously being executed:

The add rate and the tandem rates are measured for every Tstat.

Each node sends a Fairness message to its upstream node every Tmsg. The message includes an advertised rate, which is the target rate for the upstream node or nodes to control their leaky bucket.

Each node monitors the numbers of sources tandeming through.

Each node continuously receives Fairness messages on the opposite ring and processes this message.

The Advertised Rate Generator 100, checks if the bandwidth utilization of the WAN output port 15 exceeds a threshold that defines congestion. If there is no congestion, the advertised rate to the upstream nodes is full ring bandwidth. This message is transmitted out on WAN port 80. If congestion is detected, this node will then control the output bandwidth of all the nodes in the congested span. This node is called a HEAD node. Output bandwidth control is achieved by advertising target rate to the upstream nodes. The target rate as received by the upstream nodes is applied to the leaky bucket 110. As upstream nodes conforms to the advertised rates, the result can be measured by the HEAD node in its tandem rate monitor.

At each stage of congestion, different rates are advertised to the upstream nodes. The Advertised Rate generator 100 can advertise a fair rate for all upstream nodes. After advertising a target rate, the HEAD node continues to monitor the bandwidth utilization on its output link. If congestion persists then it will advertise a smaller target rate than before. This process continues until the HEAD node output bandwidth utilization reaches its maximum value. As equilibrium is achieved, all nodes will transmit the same rate. The link bandwidth is equally divided. If spare capacity is detected in the output link, the Advertised rate generator 100 will advertise a larger target rate to the upstream nodes.

The downstream rate receive mode (DS-rate Rx) 105 performs two tasks.

It continuously monitors the ring traffic opposite to the data flow for Fairness message from the downstream nodes.

It forwards the received target rate from a downstream node to the Advertised rate generator 100 which either forwards the target rate to its upstream node or terminates the target message.

The fairness algorithm applies to a congestion span. A span has a HEAD, a CHAIN and a TAIL. The HEAD is the node that detected congestion at its output link 15. The congestion, if caused by multiple nodes, must consist of a finite number of nodes. All nodes, except the HEAD and the last node, are CHAIN nodes. The last node is called the TAIL node. The difference between the CHAIN node or nodes and the TAIL node is that a tail node has tandem traffic not greater than a Minimum threshold. The fairness algorithm tries to ensure equal bandwidth allocation for all nodes in the congested span.

The foundation of a head node has being described above. The formation of a CHAIN or TAIL is simply established by a node receiving a Downstream rate that is not equal to the Congestion Threshold.

Figure 6:
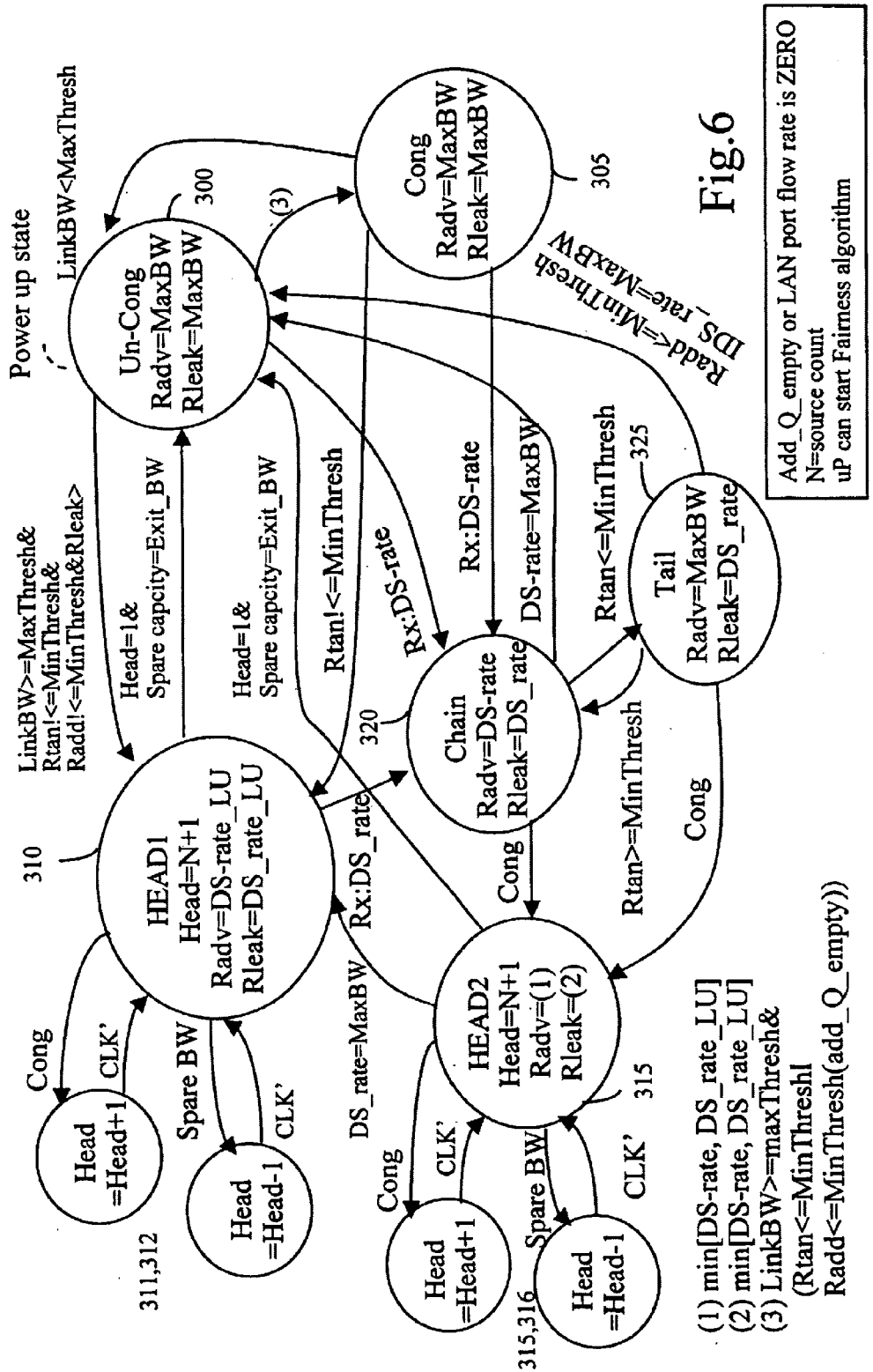
FIG. 6 is a state diagram depicting a fairness algorithm embodying the present invention.

FIG. 6 is a state diagram depicting a fairness algorithm embodying the present invention.

In the heart of the fairness scheme is a state machine that controls two key values.

The advertised target rate to the upstream node, and The leak rate applied to the Leaky bucket.

The fairness state machine includes 6 major states and 4 minor states.

Un-congested state 300. This is the default state.

Normal Congested State 305. If the congestion is caused by a single note or a node that is not adding traffic, i.e., not contributing to a congestion at its output link 15 it is this state.

HEAD 1 state 310. When congestion is first detected, the head of the congested span must take action by advertising target rate to the upstream nodes and applying it to its add traffic. This state continuously adjusts its advertised rate up or down depending on the output link utilization.

HEAD=HEAD+1 311 state. This is a minor state that lowers the advertised rate to the next lower value.

HEAD=HEAD+1 state 312. This is minor state that raises the advertised rate to the next high value. The decision to raise the advertised rate is because spare capacity is observed on the output link.

When the congestion rate has passed, each node returns to its normal un-congested state 300.

Head 2 state 315. This second head state is required to take into account if congestion may occur within the span. As traffic flow changes, for example, quiet nodes in a span starts transmitting data. Congestion may occur within an existing span or multiple spans may merge as one. The HEAD 2 state allows a single span to encompass other spans. HEAD 1 and HEAD 2 differs in their advertised rate calculation. HEAD 1 is the true head node of the congested span. It controls the target rate for all nodes in the span. HEAD 2 will propagate the minimum target rate received from HEAD 1 or from its perspective. This concept is required to encompass overlapping spans.

HEAD+HEAD+1 316 state. This is a minor state that raises the advertised rate to the next lower value.

HEAD=HEAD+1 317. This is a minor state that raises the advertised rate to the next higher value. The decision to raise the advertised rate is because spare capacity is observed on the output link.

When the congestion state has passed, each node returns to its normal un-congested state 300.

Chain state 320. In a congested span, if a node is not the head node, then it is either a chain node or a tail node. These nodes are simply identified as a node that receives a target rate less than the maximum leak rate allowed, which could be the congestion threshold. A chain node forwards a received Downstream rate upstream and applies the received Downstream rate to its Leaky bucket.

Tail state 325. The tail state differs from a chain node by the fact that its tandem traffic is small; hence its tandem traffic is not contributing to the downstream congestion. A tail node does not forward its Downstream rate to its upstream node but applies the received Downstream rate to its Leaky bucket. If a tail node stops adding traffic to the congestion span, it drops itself off the span. The downstream node will automatically become the tail. If the tail node detects significant amount of passthrough traffic, it becomes a chain node, and one of its upstream nodes will become the new tail. This allows the span to grow.

Figure 7:
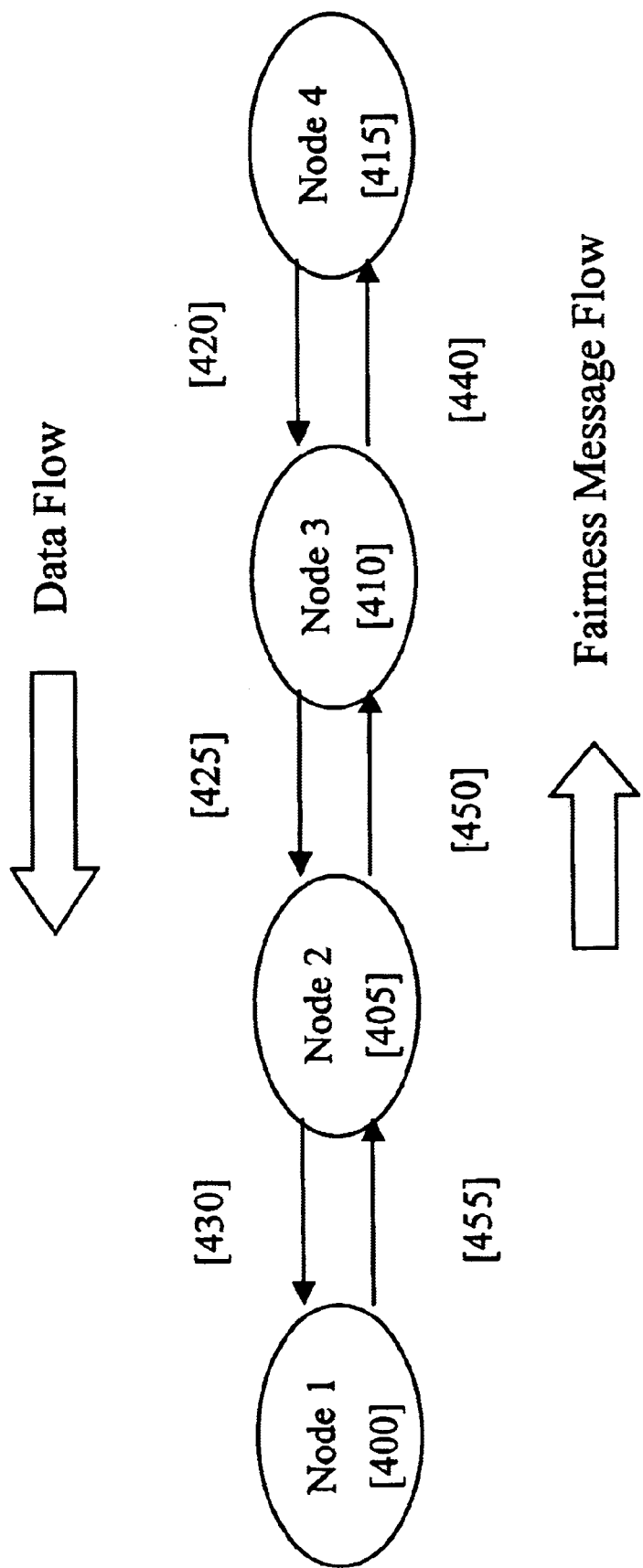
FIG. 7 depicts four nodes in a bi-directional ring network.

FIG. 7 depicts four nodes in a bi-direction ring network. Node 2 is upstream from Node 1, Node 3 is upstream from Node 2, and Node 4 is upstream from Node 3. The maximum allowable bandwidth on the ring is the same as congestion threshold, and is defined as 95% of the maximum bandwidth. The minimum traffic rate to the considered significant is defined as 5% of the ring bandwidth.

The Initial Condition will now be described.

All nodes start up in the Un-congested state. Each node can burst up to the ring bandwidth because the Leaky bucket 110 is not enabled. As start up, these is no congestion in the network Each node continuously monitors its tandem traffic rate. The rate monitoring can be implemented by a fix window estimator. It is a programmable timer with period set Tstat. When the timer expires the current tandem count is used for rate calculation and the bin is cleared. When the next packet is received in the passthrough path, the packet size is accumulated in the bin. The accumulation continues for all packets received until the next Tstat timer expiration event. This process repeats itself.

The total ring Bandwidth may be subdivided into different classes. Each class may have its own fairness algorithm running. Each node will measure tandem and add rate for each of the classes.

Each node continuously monitors its add traffic rate. The same mechanism is used for tandem rate estimation. The add traffic can be stored for different destination. Based on the congestion notification message, packet destination passthrough the congested link is rate limited, but packet destined to node before the congestion can be sent with separate rate limiter.

Each node has a message timer with a programmable timer value, Tmsg. When this timer expires a fairness message is sent to the upstream node. The content of the message is the advertised rate for the upstream node. In the case that there is no congestion, the advertised rate is 95% ring bandwidth.

Alternatively, the fairness message can be sent triggered on changing events in the network. For example, a changing event can be defined as detection of congestion; HEAD node detects over utilization of the downstream link bandwidth; HEAD node detects under utilization of the downstream link bandwidth; or changes in rates monitored for the sources in the congested span; or excess head of line delay for the add traffic.

The fairness message may contain information where congestion is detected. A fairness message is sent every Tmsg time, or it can be sent when a new message is received.

Each node receives fairness message from its downstream node. In the un-congested case, the received Downstream rate is 95% ring Bandwidth.

Congestion Handwidth Allocation will now be described.

Congestion is created as follows: Nodes 2, 3, and 4 start to send or try to send 40% of ring bandwidth worth of data to Node 1. Node 4 can put all of its traffic onto the ring. Its output link 420 is 40% utilized. Node 3 can put all of its traffic onto the ring. Its output link 425 is 80% utilized. However, Node 2 can only put 50% of its traffic onto the ring.

Node 2 detects its output link is congested, as its utilization crosses the Congestion Threshold. Node 2 becomes the head node. It picks an initial target value for the upstream nodes. The initial value is determined by monitoring the number of sources that tandems through Node 2. In this case, the number is two. From its state look up table it then find its current head node state and a corresponding advertise rate. This rate is then advertised to the upstream nodes and is used to control their own leaky bucket 110. In this example, the fair advertised rate is 31% of the ring bandwidth because there are three nodes in the congestion span.

In the state table, an entry identifies the current head state. For each head state there is an entry for the advertised rate, and an entry for output link utilization. The head node continuously monitors its output link utilization. Congestion could increase as other nodes join in. The head node detects congestion and increases its head state number. The larger the head state number, the smaller the advertised rate value. Thus the limited ring bandwidth is equally divided among the competing nodes.

Alternatively, when congestion is detected, the head node can advertise a probe rate; some rate that is less than the total number of nodes in the network. The head node then measures the tandem rate over a sampling period and then divide the sampling rate by the probe rate to determine the number of upstream nodes.

Alternatively, each node can monitor the tandem rate for each source that tandems through a node. If all nodes in the congested span are not sending the same amount of traffic, a more intelligent decision can be made to target the heaviest traffic sourcing node.

Each node can also have a preference associated to each source. When congestion is detected it can selectively target nodes that are marked with lower preference first.

Node 3 receives a Downstream rate of 31% of ring bandwidth and sets its leaky bucket to the target rate. Node 3's tandem rate estimator detects significant tandem traffic and forwards the target rate to Node 4.

Node 4 receives a Downstream rate of 31% of ring bandwidth and sets its leaky bucket to the target rate. Node 4's tandem rate estimator detects no tandem traffic and hence does not forward the target rate to its upstream node. Node 4 becomes the tail node.

With the leaky bucket enabled, all nodes are not sending a fair rate, which is less than its desired rate. The excess packets will be buffered in the Add queue 50. When it becomes full, or partially full, it can apply back pressure to the WAN Ingress port 25, or it can discard the packet, e.g. based on algorithm such as Random Early Discard (RED).

A congested node receives a DS rate, fair rate, and controls its leaky bucket based on a function of the DS rate or local add rate. A function may be of packet priority profile. A node transmitting high priority traffic at a rate greater than the DS rate may set its leaky bucket to the high priority traffic rate. This will cause the congestion at the downstream link of the head node. The HEAD node will in response, advertise a lower rate, less fair rate, to the upstream nodes. Only the lower priority traffic source nodes will align its add rate to the advertised rate. This is a method of providing preferential treatment to high priority traffic.

A node's leak rate may be echoed back to the head node for fault diagnostic purpose.

Congestion Removal will now be described.

In this example, Node 4 stops sending packets because it has no more data to send. Node 4 detects its add rate has diminished below the minimum threshold and changes state from the TAIL 325 to Un-Congested State 300. Node 2 detects its output link utilization drops below its minimum utilization value in the state table. This is the second value stored in the state table. Node 2 decreases its HEAD state number from the state table it picks a larger advertised rate and sends it to Node 3. Node 3 at the same time detects insignificant traffic from Node 4 and takes over as being the TAIL. Node 3 receives a new target rate from Node 2 and applies it to its Leaky bucket. The span has now decreased its size and a new higher fair rate applies to all nodes in the span.

Node 2's bandwidth demand drops. When it is sending less traffic than the minimum threshold bandwidth, it changes state from the HEAD to the UN-congested state. Node 2 advertises Maximum allowable ring Bandwidth to Node 3.

Lastly, Node 3 receives a target of Maximum allowable ring bandwidth and transition from the TAIL state to the Un-Congested state. Now all nodes are back to initial condition.

Implementation will now be described.

This algorithm can be implemented completely in hardware. The algorithm can also be implemented in software if the processor mode can receive data at WAN port rate. IF the following functions are implemented in hardware a slower processor can be used to implement the fairness algorithm.

Tandem rate estimator

Add rate estimator

Downstream rate receive block

Advertised rate transmit block

While the present invention has been described in connection with what is presently considered to be the most practical and preferred embodiments, it is to be understood that the invention is not limited to the disclosed embodiments. To the contrary, the present invention is intended to cover various modifications, variations, adaptations and equivalent arrangements included within the spirit and the scope of the appended claims. The scope of the claims is to be accorded the broadest interpretation so as to encompass all such modifications and equivalent structures and functions.

What is claimed is:

1. A method for managing the access of a node to a bi-directional ring network, the node having a downstream link and an output bandwidth, the method comprising the steps of:
   a. identifying the node as being part of a congested span;
   b. adjusting the output bandwidth of the node as a function of the congestion in the span.

2. A method as defined in claim 1, comprising the steps of:
   a. receiving at the node a DS rate from a downstream node in a congested span of which the node is a part;
   b. adjusting the output bandwidth of the node as a function of the DS rate;
   c. setting an add rate for the node as a function of the DS rate.

3. A method as defined in claim 2, wherein step "b" comprises the step of:
   b. setting an add rate for the node as a function of the DS rate.

4. A method as defined in claim 1, wherein the function is a fair function.

5. A method as defined in claim 1, wherein the function is an unfair function.

6. A method as defined in claim 1, comprising the steps of:
   a. determining whether the downstream link of the node is congested;
   b. if the downstream link is congested, adjusting the output bandwidth of the node as a function of the congestion in the downstream link.

7. A method as defined in claim 6, wherein step "b" comprises the steps of:
   b. if the downstream link is congested:
      i. adjusting the output bandwidth of the node as a function of the congestion in the downstream link;
      ii. adjusting the output bandwidth of one or more upstream nodes contributing to congestion in the downstream link as a function of the congestion in the downstream link.

8. A method as defined in claim 6, wherein step "b" comprises the steps of:
   b. if the downstream link is congested:
      i. setting a target rate for the node;
      ii. setting an add rate for the node as a function of the target rate;
      iii. setting an advertised rate for the node as a function of the target rate;
      iv. sending the advertised rate to one or more upstream nodes contributing to congestion in the downstream link;
      v. measuring the downstream link utilization;
      vi. setting the target rate as a function of the downstream link utilization;
      vii. setting the add rate as a function of the target rate;
   vii. repeating steps "ii" to "vii".

9. A method as defined in claim 8, wherein steps "vi" and "vii" comprise the steps of:
   vi. if the downstream link is overutilized:
      (1) decreasing the target rate;
      (2) setting the add rate as a function of the target rate and any DS rate;
   vii. if the downstream link is underutilized;
      (1) increasing the target rate;
      (2) setting the add rate as a function of the target rate and the DS rate.

10. A method as defined in claim 9, wherein steps "vi" and "vii" comprise the steps of:
    vi. if the downstream link is overutilized;
       (1) decreasing the target rate to a next smallest value;
       (2) setting the add rate as a function of the target rate and the DS rate;
    vii. if the downstream link if underutilized;
       (1) increasing the target rate to a next highest value;
       (2) setting the add rate as a function of the target rate and the DS rate.

11. A method as defined in claim 8, wherein step "vii" comprises the step of:
    viii. repeating steps "ii" to "vii" until the target rate is reaches a maximum threshold.

12. A method as defined in claim 1, comprising the steps of:
    a. receiving at the node a DS rate from a downstream node in a congested span of which the node is a part;
    b. determining whether the downstream link of the node is congested;
    c. adjusting the output bandwidth of the node as a function of the DS rate and the congestion in the downstream link.

13. A method as defined in claim 12, further comprising the step of:
    d. adjusting the output bandwidth of one or more upstream nodes contributing to congestion in the downstream link as a function of the DS rate and the congestion in the downstream link.

14. A method as defined in claim 1, comprising the steps of:
    a. receiving at the node a DS rate from a downstream node in a congested span of which the node is part;
    b. setting an add rate for the node as a function of the DS rate;
    c. determining whether the downstream link of the node is congested;
    d. if the downstream link is congested:
       i. setting a target rate for the node;
       ii. setting an add rate for the node as a function of the target rate and the DS rate;
       iii. setting an advertised rate for the node as a function of the target rate and the DS rate;
       iv. sending the advertised rate to one or more upstream nodes contributing to congestion in the downstream link;
       v. measuring the downstream link utilization;
       vi. setting the target rate as a function of the downstream link utilization;
       vii. setting the add rate as a function of the target rate and the DS rate;
       viii. repeating steps "ii" to "vii".

15. A method as defined in claim 14, wherein in step "c", congestion is defined as a function of the maximum bandwidth of the downstream link.

16. A method as defined in claim 14, wherein:
    a. in step "vi", overutilization of the downstream link is defined as a function of the maximum bandwidth of the downstream link;
    b. in step "vii", underutilization of the downstream link is defined as a function of the maximum bandwidth of the downstream link.

17. A method as defined in claim 1, wherein the step of identifying the node includes the step of identifying a head node in the congested span, which has a congested downstream link, and the step of identifying a chain node in the congested span, which contributes to the congestion in the downstream link.

18. A method as defined in claim 17, further comprising the step of sending a fairness message to the upstream node in the congested span to adjust the output bandwidth of the node.

19. A method as defined in claim 18, further comprising the step of determining, on the head node, whether the downstream link is underutilized, and the step of increasing, on the head node, a target rate when the downstream link is underutilized, the fairness being sent with the target rate to the upstream node.

20. A method as defined in claim 18, further comprising the step of determining, on the head node, whether the downstream link is overutilized, and the step of decreasing, on the head node, the target rate when the downstream link is overutilized, the fairness message being sent with the target rate to the upstream node.

21. A method for managing the access of nodes to a bi-directional ring network, the method comprising the steps of:
   a. identifying a congested span comprising a plurality of nodes;
   b. adjusting the output bandwidth of the nodes in the congested span as a function of the congestion in the span.

22. A method as defined in claim 21, comprising the steps of:
   a. identifying a congested span comprising a head node having a congested downstream link, and a plurality of chain nodes contributing to the congestion in the downstream link;
   b. adjusting the output bandwidth of the head node as a function of the congestion in the downstream link;
   c. adjusting the output bandwidth of the chain nodes as a function of the congestion in the downstream link.

23. A method as defined in claim 21, wherein the step of identifying a congested span includes the step of identifying a group of nodes as a congested span, the group of nodes including a head node which has a congested downstream link and a chain node which contributes to the congestion of the downstream link, and the step of adjusting the output bandwidth of the nodes includes the step of sending fairness messages to upstream nodes in the congested span to alleviate the congestion in the downlink congestion.

24. An apparatus for managing the access of a node to a bi-directional ring network, the node having a downstream link and an output bandwidth, the apparatus comprising:
   a. means for identifying a congested span comprising a plurality of nodes;
   b. means for adjusting the output bandwidth of the nodes in the congested span as a function of the congestion in the span.

25. Computer executable software code stored on a computer readable medium, the code for managing the access of a node to a bi-directional ring network, the node having a downstream link and an output bandwidth, the code comprising:
   a. code to identify the node as being part of a congested span;
   b. code to adjust the output bandwidth of the node as a function of the congestion in the span.

26. A programmed computer for managing the access of a node to a bi-directional ring network, the node having a downstream link and an output bandwidth, comprising:
   a. a memory having at least one region for storing computer executable program code; and
   b. a processor for executing the program code stored in the memory;
   c. wherein the program code includes:
      i. code to identify the node as being part of a congested span;
      ii. code to adjust the output bandwidth of the node as a function of the congestion in the span.

27. A computer readable medium having computer executable software code stored thereon, the code for managing the access of a node to a bi-directional ring network, the node having a downstream link and an output bandwidth, comprising:
   a. code to identify the node as being part of a congested span;
   b. code to adjust the output bandwidth of the node as a function of the congestion in the span.

28. A computer data signal embodied in a carrier wave comprising, for managing the access of a node to a bi-directional ring network, the node having a downstream link and an output bandwidth;
   a. identify the node as being part of a congested span;
   b. code to adjust the output bandwidth of the node as a function of the congestion in the span.

29. An apparatus managing the access of a node to a bi-directional ring network, the node having a downstream link and an output bandwidth, the apparatus comprising:
   a. an identifier to identify the node as being part of a congested span;
   b. an adjuster to adjust the output bandwidth of the node as a function of the congestion in the span.

30. An apparatus as defined in claim 29, comprising:
   a. a forwarding filter database for receiving packets from a WAN input port and for forwarding the packets to a WAN output port through a passthrough fifo and a scheduler, or dropping the packet to a WAN egress port through a drop queue;
   b. an ingress filter database for receiving packets from a WAN ingress port and for forwarding the packets to a WAN output port through an add queue, a leaky bucket and the scheduler;
   c. a tandem rate estimator for calculating a tandem rate by counting packets passing through the passthrough fifo over a first time period;
   d. an add rate estimator for calculating an add rate by counting packets passing through the leaky bucket over a second time period;
   e. an advertise rate generator for calculating the bandwidth utilization of the WAN output port from the tandem rate and the add rate and for determining an advertise rate as a function of the bandwidth utilization and any DS rate received as a DS rate receive module.

* * * * *